US009855780B2

(12) United States Patent
Stoffel, Jr. et al.

(10) Patent No.: US 9,855,780 B2
(45) Date of Patent: Jan. 2, 2018

(54) PRINT MEDIA FOR INKJET PRINTING

(71) Applicant: Hewlett-Packard Development Company, L.P., Fort Collins, CO (US)

(72) Inventors: John L. Stoffel, Jr., San Diego, CA (US); Silke Courtenay, San Diego, CA (US); Thomas Roger Oswald, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/109,931

(22) PCT Filed: Jan. 30, 2014

(86) PCT No.: PCT/US2014/013808
§ 371 (c)(1),
(2) Date: Jul. 6, 2016

(87) PCT Pub. No.: WO2015/116095
PCT Pub. Date: Aug. 6, 2015

(65) Prior Publication Data

US 2016/0332468 A1 Nov. 17, 2016

(51) Int. Cl.

| | |
|---|---|
| ***B41M 5/52*** | (2006.01) |
| ***D21H 17/16*** | (2006.01) |
| ***D21H 17/66*** | (2006.01) |
| ***C09D 11/38*** | (2014.01) |
| ***B41M 5/00*** | (2006.01) |

(52) U.S. Cl.
CPC ........ *B41M 5/0035* (2013.01); *B41M 5/5227* (2013.01); *D21H 17/16* (2013.01); *D21H 17/66* (2013.01)

(58) Field of Classification Search
CPC ........ B41M 5/50; B41M 5/52; B41M 5/5227; D21H 17/16; D21H 17/66; C09D 11/38
USPC ........................................................ 428/32.21
See application file for complete search history.

(56) References Cited

U.S. PATENT DOCUMENTS 6,207,258 B1 * 3/2001 Varnell ................ B41M 5/0017 428/32.1
7,211,608 B2 5/2007 Niinikoski et al.
(Continued)

FOREIGN PATENT DOCUMENTS

CN 1265625 9/2000
CN 101033591 9/2007
(Continued)

OTHER PUBLICATIONS

International Search Report dated Oct. 29, 2014 for PCT/US2014/013808, Applicant Hewlett-Packard Development Company, L.P.
(Continued)

*Primary Examiner* — Bruce H Hess
(74) *Attorney, Agent, or Firm* — HP Inc. Patent Department

(57) ABSTRACT

A print medium having a base substrate including a blend of cellulosic fibers, a sizing material present in an effective amount from about 0 Kg/Ton of the print medium to about 1 Kg/Ton of the print medium, and a multivalent cation salt present in a synergistic amount from about 4 Kg/Ton of the print medium to about 25 Kg/Ton of the print medium.

12 Claims, 2 Drawing Sheets

(56) References Cited

U.S. PATENT DOCUMENTS

| | | | | |
|---|---|---|---|---|
| 7,582,188 | B2 * | 9/2009 | Stoffel .................. | C09D 11/30 162/158 |
| 8,480,225 | B2 | 7/2013 | Romano, Jr. et al. | |
| 8,678,543 | B2 * | 3/2014 | Zhou .................... | B41M 5/5218 347/100 |
| 9,068,292 | B2 * | 6/2015 | Stoffel .................. | D21H 27/00 |
| 2008/0081203 | A1 | 4/2008 | Knight et al. | |
| 2009/0035478 | A1 | 2/2009 | Zhou et al. | |
| 2011/0205287 | A1 | 8/2011 | Zhou et al. | |
| 2011/0279554 | A1 | 11/2011 | Dannhauser et al. | |
| 2012/0019587 | A1 | 1/2012 | Koenig | |
| 2012/0040111 | A1 | 2/2012 | Kaessberger et al. | |
| 2013/0235118 | A1 | 9/2013 | Zhou et al. | |

FOREIGN PATENT DOCUMENTS

| | | |
|---|---|---|
| CN | 101287611 | 10/2008 |
| CN | 101983267 | 3/2011 |
| CN | 102186678 | 9/2011 |
| WO | 2010044795 | 4/2010 |
| WO | 2013115809 | 8/2013 |

OTHER PUBLICATIONS

Extended European Search Report dated Jan. 5, 2017 for PCT/US2014/013808, Applicant Hewlett-Packard Development Company, L.P.

* cited by examiner

PRINT MEDIA FOR INKJET PRINTING

BACKGROUND

In inkjet printing, small droplets of ink are propelled onto a print medium, such as a sheet of paper, at precise locations to create an image. The ink droplets dry, partly by getting absorbed into the print medium and partly by evaporation of a liquid vehicle medium in the ink, thereby forming the image on the print medium. Inkjet printers that utilize such a printing technique are commonly used both for small scale printing, such as at home or in the office, and for large scale industrial printing. With advances in printing technology, the speed of inkjet printers has substantially increased, resulting in reduced delay between stacking of printed sheets.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
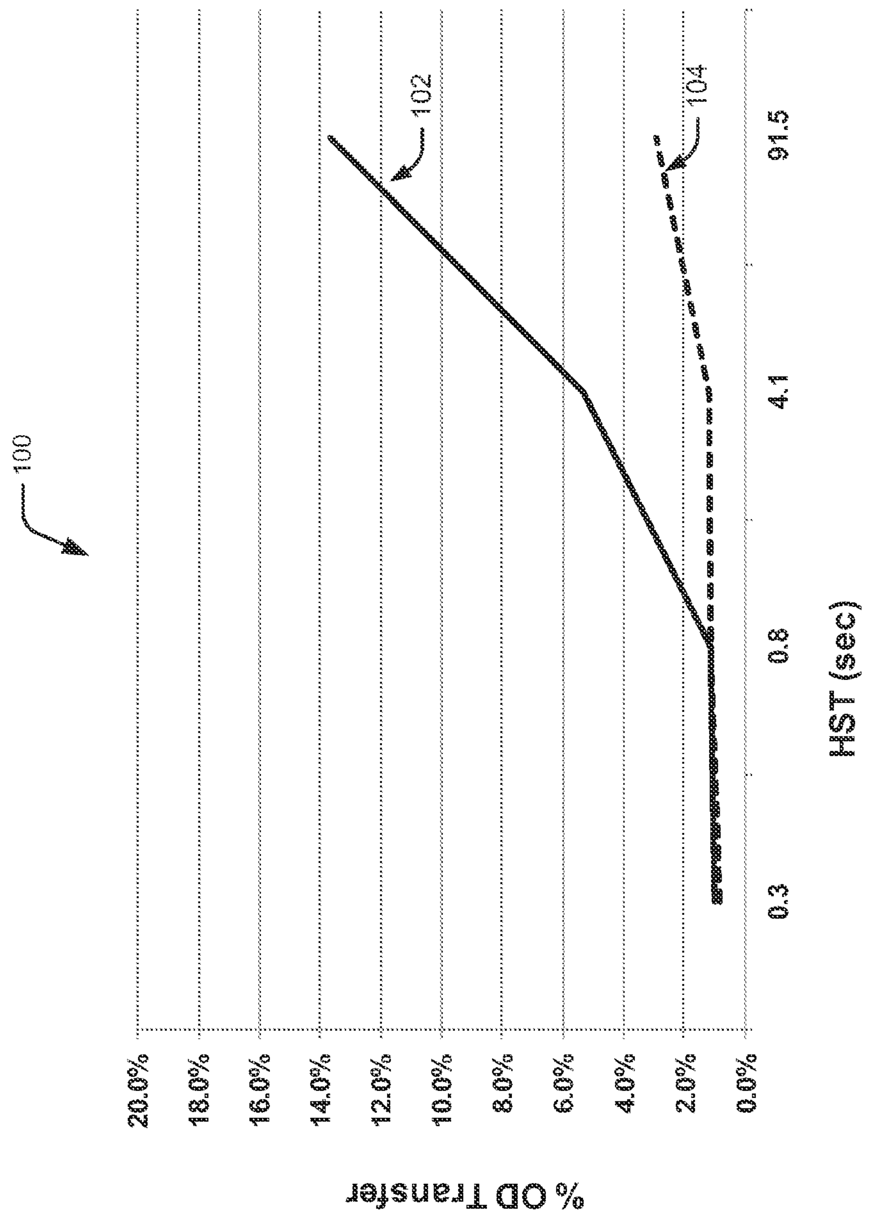
FIG. 1 is a graph illustrating the variation in ink transfer for different Hercules Size Test (HST) print media, according to an example of the present subject matter.

As inkjet printers are being designed to print faster, the print media also has to dry faster to ensure that there is no smearing or transfer of ink from the paper. For example, in some cases, the ink can get transferred from one sheet to another if the ink on one sheet does not dry before the next sheet is placed over it in the stack. Typically, print media for inkjet printing, also referred to as print media hereinafter, comprises a base substrate, made of hardwood fibers or softwood fibers or a combination of the two, having fillers, such as precipitated calcium carbonate (PCC), clay, talc, $TiO_2$ or a combination thereof, and is treated with sizing material, such as starches or alkyl succinic anhydride (ASA) or alkyl ketene dimer (AKD).

The sizing material is generally used to reduce the absorption of ink into the base substrate so that the print quality, for example, as measured by the optical density of the printed image, improves. However, reduction in the absorption of ink results in higher ink drying time. Hence, there is generally a trade-off that is observed between ink drying time and print quality, i.e., when papers are designed to be more absorptive, print quality is generally affected.

The present subject matter relates to print media for inkjet printing. Certain terms are used throughout the description to refer to certain components and are to be construed as being mentioned by way of example and for purposes of explanation and not as limiting.

The term "about" when referring to a numerical value or range is intended to encompass the values resulting from experimental error that can occur when taking measurements. Such measurement deviations are usually within plus or minus 10 percent of the stated numerical value.

The term "print quality" or "PQ" when referring to an inkjet printed image, may refer to one or more printing characteristics, such as optical density (OD) or "print density", color gamut, edge acuity, strikethrough, and ink dry time of the printed medium.

"Black optical density" (KOD) is the optical density of a black colored image and is measured as a logarithmic value calculated from a reflectance measurement. $KOD=\log_{10}(100/R_b)$ where $R_b$ is the reflection value of the black colored image expressed in units of %. The higher the KOD value, the darker the black colored image obtained.

"Magenta optical density" (MOD) is the optical density of a magenta colored image and is measured as a logarithmic value calculated from a reflectance measurement. $MOD=\log_{10}(100/R_m)$ where $R_m$ is the reflection value of the magenta colored image expressed in units of %. The higher the MOD value, the darker the magenta colored image obtained.

"Ink dry time" refers to the time it takes for the ink to dry such that it will not smear or transfer to other surfaces.

"Base substrate" includes traditional papers, such as woody paper, non-woody paper; synthetic paper, and recycled paper, from which the print media can be prepared. More generally, base substrate encompasses a substrate based on cellulosic fibers and other known paper fibers. The base substrate may be of any dimension, for example, size or thickness, or form such as pulp, wet paper, and dry paper. The base substrate can be in the form of a roll, or in the form of a flat or sheet structure, which may be of variable dimensions. In particular, base substrate is meant to encompass plain paper or un-coated paper or a paper with fillers or surface pigments. For example, a base substrate may be from about 2 mils to about 30 mils thick, depending on a desired end application for the print medium.

The base substrate may be made from hardwood pulp or softwood pulp or a combination of the two and may include fillers, such as precipitated calcium carbonate (PCC), other forms of calcium carbonate (GCC), clay, talc, $TiO_2$, or a combination thereof. The term "hardwood pulps" refers to fibrous pulp derived from the woody substance of deciduous trees (angiosperms), such as birch, oak, beech, maple, and eucalyptus. The term "softwood pulps" refers to fibrous pulps derived from the woody substance of coniferous trees (gymnosperms), such as varieties of fir, spruce, and pine, as for example loblolly pine, slash pine, Colorado spruce, balsam fir and Douglas fir.

"Print media" refers to the media, such as paper, prepared from the base substrate and suitable for inkjet printing. The print media can be used either for printing at large industrial scales or for use with a home or office printer. Like the base substrate, the print media can be in the form of a roll, or in the form of a flat or sheet structure, which may be of variable dimensions. Further, the print media can undergo additional processing, in addition to and either before or after the treatment provided to the base substrate in accordance with the present subject matter. The additional processing may include processing as may be commonly carried out in the papermaking industry to form writing paper, drawing paper, photo paper, coated paper and the like. For example, additional ingredients, such as pigments, dispersants, optical brighteners, fluorescent dyes, surfactants, defoaming agents, preservatives, pigments, binders, pH control agents, coating releasing agents, rheology modifiers and any other suitable coating or surface treatment materials that are typically used and are compatible with the present subject matter, may be applied.

"Hercules Size Test" (HST) refers to the standard Hercules type method, such as the TAPPI standard test method T 530, for testing the sizing on a substrate based on time taken for a mix of Hercules green dye and 2% formic acid solution to penetrate through the substrate. The test results are generally expressed in time units.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1-10 Kg should be interpreted to include not only the explicitly recited limits of about 1 Kg to about 10 Kg, but also to include sub-ranges such as 1 to 8 Kg, 2 to 5 Kg, and so forth, as well as individual amounts, including fractional amounts, within the specified ranges, such as 2 Kg, 3.5 Kg, and 5 Kg, for example.

It will be appreciated that various terms have been defined above merely for convenience. These definitions should be read in the light of the remainder of the disclosure and understood as by a person of skill in the art. The various terms used herein have the meanings recognized and known in the art; however, for convenience and completeness, particular terms and their meanings have been provided above.

According to the present subject matter, the print media can be made such that the print media is highly absorptive and at the same time the print quality, for example, as measured by optical density, is also high. Thus, the print media according to the present subject matter can achieve fast drying time and high print quality. In one implementation, the print media of the present subject matter can be obtained by reducing the amount of sizing, otherwise typically used in papers, to an effective amount to increase the rate of absorption of ink and thereby reduce the ink drying time. Further, the print media of the present subject matter can include a multivalent cation salt in a synergistic amount to improve the print quality that may otherwise deteriorate when the amount of sizing is reduced.

In one implementation, the print media comprises a base substrate comprising a blend of hardwood fibers and softwood fibers, a sizing material present in an effective amount from about 0 Kg/Ton of the print media to about 1 Kg/Ton of the print media, and a multivalent cation salt present in a synergistic amount from about 4 Kg/Ton to about 25 Kg/Ton of the print media. In one example, the sizing material may be alkyl succinic anhydride (ASA) and the multivalent cation salt may be calcium chloride. Further, the print media may have a Hercules Size Test (HST) in a range of about 0-10 seconds, and a Black optical Density (KOD) of at least 1.15. In one example, the print media may have a HST in a range of about 0.3-4.5 seconds. Thus, in an example, the effective amount of a sizing material may be understood to be the amount of sizing material that results in an HST of about 0-10 seconds. Similarly, in one example, a synergistic amount of the multivalent cation salt may be understood as the amount of the multivalent cation salt that results in a KOD of at least 1.15 when used with the effective amount of the sizing material.

In one example, the effective amount of the sizing material in the print media may range from about 0.25 Kg/Ton to about 0.75 Kg/Ton of the print media, while the synergistic amount of the multivalent cation salt may range from about 5.5 Kg/Ton to about 20 Kg/Ton of the print media.

Examples of suitable sizing material include, but are not limited to, starches and starch derivatives, carboxy methylcellulose (CMC), methyl cellulose, alginates, waxes, wax emulsions, alkylketene dimer (AKD), alkyl succinic anhydride (ASA), alkenyl ketene dimer emulsion (AnKD), emulsions of ASA or AKD with cationic starch, ASA incorporating alum, Water-soluble polymeric materials, such as polyvinyl alcohol, gelatin, acrylamide polymers, acrylic polymers or copolymers, vinyl acetate latex, polyesters, vinylidene chloride latex, styrene-butadiene, acrylonitrile butadiene copolymers, styrene acrylic copolymers and copolymers, and combinations thereof. In many applications some type of starch is used as a surface sizing agent. Examples of suitable starches are corn starch, tapioca starch, Wheat starch, rice starch, sago starch and potato starch. These starch species may be unmodified starch, enzyme modified starch, thermal and thermal-chemical modified starch and chemical modified starch. Examples of chemical modified starch are converted starches such as acid fluidity starches, oxidized starches and pyrodextrins; derivatized starches such as hydroxyalkylated starches, cyanoethylated starch, cationic starch ethers, anionic starches, starch esters, starch grafts, and hydrophobic starches.

In addition, the print media of the present subject matter includes synergistic amounts of salt(s) of multivalent cations to attain acceptable print quality as mentioned above. In one example, the multivalent cation salt may be selected from a group consisting of include calcium chloride ($CaCl_2$), magnesium chloride ($MgCl_2$), aluminum chloride ($AlCl_3$), magnesium sulfate ($MgSO_4$), calcium acetate ($Ca(C_2H_3O_2)_2$), calcium propionate $Ca(C_2H_5COO)_2$, calcium lactate ($C_6H_{10}CaO_6.xH_2O$), calcium nitrate $Ca(NO_3)_2$ and combinations thereof. The type of salt, or combinations of salts, can be selected based upon factors such as cost, availability, potential for corrosion reduction and other paper mill process considerations. In one example, calcium chloride may be a preferred multivalent cation salt. In one implementation, the salt can be applied on the print media as a part of the surface sizing treatment using the paper machine size press. In other implementations, the salt can be applied as a part of a different stage in the paper making process.

In one implementation, the print media of the present subject matter comprises a base substrate comprising a cellulosic blend of fibers, an effective amount of a sizing material to achieve Hercules Size Test (HST) of about 0-10 seconds, and a synergistic amount of a multivalent cation salt to achieve a black optical density (KOD) of at least 1.15. The base substrate can be any cellulosic fiber blend, including hardwood fibers and softwood fibers, and may include filler material.

In one example, the effective amount of the sizing material achieves HST of about 0.3-4.5 seconds. For example, the effective amount of the sizing material is in a range of about 0 Kg/Ton to about 1 Kg/Ton of the print media. In one example, the synergistic amount of the multivalent cation salt is in a range of about 4 Kg/Ton to about 25 Kg/Ton of the print media.

In one implementation, the multivalent cation salt is calcium chloride and the sizing is ASA. Further, in one implementation, the synergistic amount of calcium chloride may be in the range of about 4 to 25 Kg per Ton of print media, particularly in the range of 8 to 20 Kg per Ton of print media, and more particularly in the range of about 10 to 15 Kg per Ton of print media. It will be understood that synergistic amounts of multivalent cation salts other than calcium chloride can be used based on the present subject matter. In one example, a synergistic amount of a different multivalent cation salt other than calcium chloride can be determined based on equivalent amount of cation capacity provided on the surface of the print media as provided by the range of 4 to 25 kg per Ton of calcium chloride salt to obtain KOD of at least 1.15.

The present subject matter further relates to a method of preparing a print media by obtaining a base substrate comprising a blend of hardwood (HW) fibers and softwood (SW) fibers in a ratio ranging from about 100% (HW):0% (SW) to about 30% (HW):70% (SW), selecting a sizing material in an effective amount ranging from about 0 to 1 Kg/Ton of the print media, selecting a multivalent cation salt in a synergistic amount ranging from about 4 to 25 Kg/Ton of the print media, and adding the sizing material and the multivalent cation salt to the base substrate, for example, at a size press during a papermaking process to form the print media.

In one example, the effective amount of the sizing material achieves Hercules Size Test (HST) of about 0-10 seconds, and the synergistic amount of the multivalent cation salt achieves a black optical density (KOD) of at least 1.15.

Base Substrate and Cellulosic Fiber Blend

The base substrate used to make an inkjet printable paper or print media comprises any type of cellulose fiber, or combination of fibers known for use in paper making. For example, the substrate may be made from pulp fibers derived from hardwood trees, softwood trees, or a combination of hardwood and softwood trees prepared for use in papermaking fiber obtained by known digestion, refining, and bleaching operations, such as those that are customarily employed in mechanical, thermomechanical, chemical and semi-chemical, pulping or other well-known pulping processes. For some applications, all or a portion of the pulp fibers are obtained from non-Woody herbaceous plants such as kenaf, hemp, jute, flax, sisal, bamboo and abaca, for example. Either bleached or unbleached pulp fiber may be utilized in preparing a suitable base substrate for the print media. Recycled pulp fibers are also suitable for use. In some applications, the base substrate is made by combining from about 30% to about 100% by weight hardwood fibers and from about 0% to about 70% by weight softwood fibers.

Further, any of a number of fillers may be included in various amounts in the paper pulp during formation of the base substrate, to control physical properties of the base substrate, depending upon the particular requirements of the user. Some suitable fillers are calcium carbonate, precipitated calcium carbonate, titanium dioxide, kaolin clay, and silicates, to name just a few, which may be incorporated into a pulp. For many base substrate formulations the filler content in the pulp is in the range of about 0% to about 40% by Weight of the dry fiber pulp. In some of those applications the filler represents about 10% to about 20% by Weight of the dry fiber pulp. In the print media, the cellulose base substrate may have a basis weight ranging from about 35-250 gsm, with about 0.5 to 35% by weight of filler, in one example.

Treatment of the Base Substrate to Obtain Print Media

To the base substrate an effective amount of a sizing material and a synergistic amount of a cation salt may be added in the size press as discussed above. In one example, the sizing material may be selected from a group consisting of starches and starch derivatives, carboxy methylcellulose (CMC), methyl cellulose, alginates, waxes, wax emulsions, alkylketene dimer (AKD), alkyl succinic anhydride (ASA), alkenyl ketene dimer emulsion (AnKD), emulsions of ASA or AKD with cationic starch, ASA incorporating alum, water-soluble polymeric materials, such as polyvinyl alcohol, gelatin, acrylamide polymers, acrylic polymers or copolymers, vinyl acetate latex, polyesters, vinylidene chloride latex, styrene-butadiene, acrylonitrile butadiene copolymers, styrene acrylic copolymers and copolymers, and combinations thereof. In many applications some type of starch is used as a surface sizing agent. Examples of suitable starches are corn starch, tapioca starch, wheat starch, rice starch, sago starch and potato starch. These starch species may be unmodified starch, enzyme modified starch, thermal and thermal-chemical modified starch and chemical modified starch. Examples of chemically modified starch are converted starches, such as acid fluidity starches, oxidized starches, and pyrodextrins; derivatized starches, such as hydroxyalkylated starches, cyanoethylated starch, cationic starch ethers, anionic starches, starch esters, starch grafts, and hydrophobic starches. In one example, the preferred sizing material may be one or more of ASA, AKD, starches, and a combination thereof. In another example, a preferred sizing material may be ASA.

The sizing material can be selected based on the end use of the print media, for example, whether the print media is to be used for photographic printing or industrial printing, etc. Further, the sizing material can be selected based on other operating parameters of the papermaking process, such as cost, process conditions, and the like, as will be understood. The effective amount of sizing material can be determined such that the print media achieves the HST in the range of about 0-10 seconds. In one example, the effective amount of sizing material may be determined so as to achieve HST in the range of 0.3-4.5 seconds. In another example, the effective amount of sizing material achieves HST in the range of 0.3-1 second.

Since both internal sizing and surface sizing controls the absorption capacity and absorption speed with respect to applied inks, thereby affecting the HST, the effective amount of sizing material may be applied as internal sizing or surface sizing or may be distributed between internal sizing and surface sizing.

While examples of the multivalent cation salt include calcium chloride ($CaCl_2$), magnesium chloride ($MgCl_2$), aluminum chloride ($AlCl_3$), magnesium sulfate ($MgSO_4$), calcium acetate ($Ca(C_2H_3O_2)_2$), calcium propionate $Ca(C_2H_5COO)_2$, calcium lactate $C_6H_{10}CaO_6.xH_2O$, calcium nitrate $Ca(NO_3)_2$ and combinations thereof, the selection of the multivalent cation salt may itself be based on one or more of cost, availability, potential for corrosion reduction and papermaking process parameters. For example, based on the material of construction of the equipment used in the papermaking process, calcium chloride may be selected in one implementation, while a combination of calcium chloride and calcium propionate may be selected in another implementation. Similarly, based on other process parameters, such as temperature of processing, suitable multivalent cation salt(s) may be selected. Further, the synergistic amount of the selected multivalent cation salt may be determined such that the print media achieves the KOD of at least 1.15.

Further, additional surface treatment materials compatible with the present subject matter, such as pigments, dispersants, optical brighteners, fluorescent dyes, surfactants, defoaming agents, preservatives, pigments, binders, pH control agents, coating releasing agents, rheology modifiers, and the like may be applied in the papermaking process.

The print media prepared as described herein helps in faster printing speeds with increased print quality and reduced smear from wet ink, for example, when there is little or no delay between stacking of printed media. The following discussion is directed to various examples of the present subject matter. Although certain methods and compositions have been described herein as examples, the scope of coverage of this patent is not limited thereto. On the contrary, the present subject matter covers all methods and compositions fairly falling within the scope of the claims either literally or under the doctrine of equivalents.

EXAMPLES

The following general methods for loading of salt, loading of sizing, and assessing print quality are used in the Examples.

Laboratory Draw Down Method for Salt Loading

The loading of salt was performed using Mayer Bar coater using a No. 8 rod to obtain an approximately 25 micrometer thick wet coating on the base substrate.

The term "sheets" as used in the examples refer to base substrates with different quantities of sizing and salt loaded onto them to form the print media and includes base substrate with no salt.

Print Quality

The black optical density and magenta optical density were measured in units of optical density ("OD"), using a reflectance densitometer. The method involves printing a solid block of color on the sheet, and measuring the optical density of the printed image. There may be some variation in OD depending on the particular printer used and the print mode chosen, as well as the densitometer mode and color setting. The printer used in the test is a HP OfficeJet Pro 8500 using ink cartridges C4900A and C4901A. The print mode was the default plain paper mode. The densitometer used was an X-RITE model 938 spectrodensitometer with a 6 mm aperture. The density measurement settings were visual color, status T, and absolute density mode.

In general, the target optical density (OD) for pigment black ("KOD") is about or greater than 1.15 in the standard (plain paper, normal) print mode for the HP desktop ink jet printers that use the most common black ink. Preferably, the KOD is equal to or greater than about 1.20. The target optical density (OD) for pigment magenta ("MOD") is about or greater than 1.10 in the standard (plain paper, normal) print mode for the HP desktop ink jet printers that use the most common magenta ink. Preferably, the MOD is equal to or greater than about 1.15.

Example 1

Print Quality of Sheets of Known HST without Cation Salt

In this example, papers made on production paper machines with different levels of sizing were taken and characterized by the HST values measured as per TAPPI standard test method T 530. On each of these sheets, the % OD transfer for black ink was measured with a delay in stacking time of 0 seconds and a delay in stacking time of 3 seconds. The results of the example are tabulated in table 1 below and graphically illustrated in FIG. 1 in graph 100.

TABLE 1

Variation of print quality with HST and stacking delay time

| | % OD Transfer (Black Ink) | | | |
|---|---|---|---|---|
| Delay time before stacking | Sheet 1 (0.3 HST) | Sheet 2 (0.8 HST) | Sheet 3 (4.1 HST) | Sheet 4 (91.5 HST) |
| 0 seconds | 1.02 | 1.12 | 5.33 | 13.63 |
| 3 seconds | 0.85 | 1.13 | 1.17 | 2.93 |

The graph 100 depicts the Hercules Size Test (HST) water absorption on x-axis versus dry time in y-axis. The dry time is expressed in percentage optical density transfer (% OD transfer) and measures the ink that is transferred to another sheet when printing. A lower % OD transfer represents a faster drying sheet.

As is shown in Table 1 and in the graph 100, when there is no delay time given before stacking the % OD transfer increases significantly with increase in HST for sheets having HST of greater than about 0.8, as depicted by curve 102 in graph 100. However, when a delay time of 3 seconds is given before stacking, there is little variation in the % OD transfer with increase in HST, as depicted by curve 104 in graph 100. Thus, in situations of fast printing with no or little delay time before stacking, sheets with high HST will tend to transfer/smear more amount of ink due to the ink not having dried quickly enough. In contrast, sheets with low HST show faster ink drying time and less % OD transfer.

Example 2

Comparison of Print Quality of Sheets of Low and High HST with Different Loading Amounts of Cation Salt In this example, to compare the print quality of sheets of low and high HST with different loading amounts of cation salt, the base sheets with different amounts of ASA sizing as used in Example 1 were taken and different amounts of calcium chloride salt corresponding to different loading levels of the salt were loaded using the laboratory drawdown method. The salt loaded print media were then tested for print quality in terms of optical density (OD) of a black inkjet ink printed using a laboratory drawdown method. A dark or high OD represents a better or darker image. Generally, an OD of less than 1.15 is considered poor print quality or not dark enough, while an OD of 1.15 is considered acceptable or dark print quality and an OD of 1.20 is preferred.

TABLE 2

| Variation in KOD with HST and Salt Loading Level | | | | | | |
|---|---|---|---|---|---|---|
| | | KOD at Different Salt Levels | | | | |
| Base Sheet | HST (sec) | Salt Level1 (4 Kg/Ton) | Salt Level 2 (5.5 Kg/ Ton) | Salt Level 3 (7 Kg/Ton) | Salt Level 3 (8.5 Kg/ Ton) | Salt Level 4 (10 Kg/Ton) |
| Sheet 1 | 0.3 | 1.13 | 1.15 | 1.17 | 1.21 | 1.22 |
| Sheet 2 | 0.8 | 1.245 | 1.24 | 1.255 | 1.255 | 1.245 |
| Sheet 3 | 91.5 | 1.43 | 1.35 | 1.42 | 1.45 | 1.455 |
| Sheet 4 | 4.1 | 1.31 | 1.365 | 1.365 | 1.355 | 1.36 |

Figure 2:
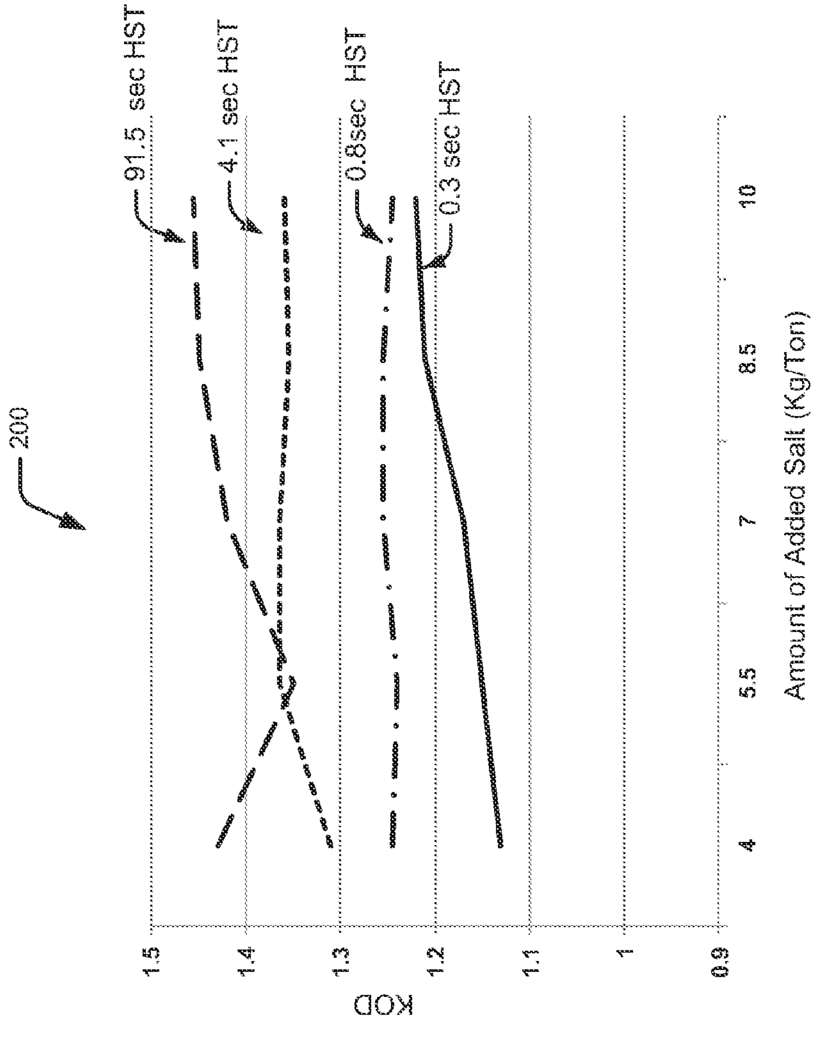
FIG. 2 is a graph illustrating the variation in print quality with different amounts of loaded salts for different HST print media, according to an example of the present subject matter.

The data as shown in Table 2 is illustrated in a graphical form in FIG. 2. Thus, FIG. 2 is a graph 200 illustrating the variation in print quality with different amounts of loaded salts for different HST sheets, according to an example of the present subject matter. As can be seen from Table 2 and graph 200, the low HST sheets having 0.3 seconds HST had reduced print quality at low salt loading of less than about 4 Kg salt/Ton paper and the print quality improved as more salt was added. It can also be seen that a salt loading of about 5.5-10 Kg salt/Ton sheets provided acceptable print quality in this example.

In comparison, the higher HST sheets had acceptable print quality to begin with, but as was seen in graph 100, they also tend to transfer more ink and have greater ink drying times. Thus from graphs 100 and 200 it can be inferred that sheets having an effective amount of sizing to achieve low HST have fast drying times and can also show acceptable print quality on addition of a synergistic amount of salt.

Example 3

Variation of HST with Amount of Sizing

A base substrate having 70% hardwood (HW) and 30% softwood(SW) fibers, and 4% PCC filler was taken. The base substrate did not have any surface sizing. Basis weight of the paper was 75 gm/m^2. During manufacturing of, the base substrate different amounts of ASA sizing were added as shown in Table 3 to form base sheets referred to as L1-L6. The HST was measured using TAPPI standard test method T 530 and the absorption was measured by Bristow wheel using black inkjet ink as the liquid. Bristow wheel test method used was ASTM D5455-93. The different HST base sheets L1-L6 were found to have the absorption and HST characteristics as shown in Table 3.

TABLE 3

| Variation of HST and absorption rates with different ASA Sizing | | | |
|---|---|---|---|
| Sheet | ASA (Kg/Ton of paper) | HST (sec) | Average Absorption rate (ml/m^2) |
| L1 | 0 | 0 | 172 |
| L2 | 0.25 | 4 | 87 |
| L3 | 0.75 | 10 | 51 |
| L4 | 1.5 | 20 | 18 |
| L5 | 2 | 40 | 15 |
| L6 | 2.75 | 85 | 17 |

As can be seen from table 3, as the amount of ASA sizing increased, the HST increased and the average absorption rate decreased, i.e., the drying time increased. Moreover, with higher ASA sizing, such as that in the base sheets L4-L6, it was observed that the printed ink showed a mottled or smudged appearance, particularly in solid inkjet print areas. On the other hand, with the lower ASA sizing, such as that in the sheets L1-L3, the HST was low and the print mottle was also low. However, as was shown in examples 1 and 2, the print quality of sheets with low HST also tends to be low.

Example 4

Print Quality of Sheets Having Different Amounts of Sizing and Loaded with a Particular Amount of Cation Salt In this example, the sheets L1-L6 with different amounts of ASA sizing as prepared in example 3 above were taken and were loaded with calcium chloride of about 8 Kg salt/Ton of sheets. For achieving this salt loading, a 3% by weight solution of calcium chloride in water was made and the solution was applied to the sheet using a #8 Mayer drawdown rod. The sheet was then dried to obtain the print media. A 3% solution of $CaCl_2$ applied in this manner on a 75 gsm base substrate is approximately equivalent to 8 Kg salt/Ton of print media. The KOD and MOD was then measured using the methods mentioned earlier. The results are tabulated in Table 4 below.

TABLE 4

| Variation of Print Quality with sizing at constant salt loading | | | | |
|---|---|---|---|---|
| Sheet | ASA (Kg/Ton of paper) | Amount of $CaCl_2$ (Kg/Ton) | KOD | MOD |
| L1 | 0 | 8 | 1.27 | 1.08 |
| L2 | 0.25 | 8 | 1.36 | 1.21 |
| L3 | 0.75 | 8 | 1.37 | 1.19 |
| L4 | 1.5 | 8 | 1.47 | 1.26 |
| L5 | 2 | 8 | 1.48 | 1.26 |
| L6 | 2.75 | 8 | 1.47 | 1.25 |

As can be seen from Table 4, on the addition of calcium chloride salt of about 8 Kg/Ton, the print quality for black ink as measured by KOD increased to acceptable levels even for low HST sheets, such as L1-L3, in comparison with high HST sheets, such as L4-L6. However, the print quality as measured for magenta ink by MOD still remained low for L1.

Example 5

Comparison of Print Quality of Sheets with Low and High Amounts of Sizing with Different Loading Amounts of Cation Salt To compare the change in print quality with salt loading on low and high HST sheets, in this example, different amounts of salt loading of calcium chloride salt were applied on the sheets with lowest HST (L1) and highest HST (L6). For loading different amounts of salt, solutions of calcium chloride in water having 0%, 1%, 3%, 5%, 7%, and 9% by weight of calcium chloride were made. The solutions were applied to the sheets using a #8 Mayer drawdown rod and the sheets were dried to obtain print media with different amounts of salt loading as shown in the table 5 below. The results of print quality using magenta ink as measured by MOD are also shown in table 5 below.

TABLE 5

Variation of Print Quality with loading of Salt and Sizing

| % Salt Solution | Approximate Amount of Salt (Kg/Ton paper) | MOD for L1 (0 HST) | MOD for L6 (85 HST) |
|---|---|---|---|
| 0% | 0 | 0.93 | 0.83 |
| 1% | 3 | 1.00 | 1.17 |
| 3% | 8 | 1.09 | 1.20 |
| 5% | 13 | 1.18 | 1.25 |
| 7% | 19 | 1.20 | 1.24 |
| 9% | 24 | 1.22 | 1.24 |

As can be seen from the table 5, L1 reached acceptable levels of print quality, i.e., about 1.1 and above, when salt was loaded in the range of about 8-24 Kg/Ton paper and preferably in the range of about 13-24 Kg/Ton paper. In comparison L6 reached acceptable levels of print quality even with salt levels of about 3 Kg/Ton paper. However, L6 also showed higher print mottle and higher drying time.

Thus, from examples 1-5, it can be seen that while high HST print media reaches acceptable levels of print quality with lower salt loading, the high HST print media also shows high print mottle and low absorption or high ink drying time. On the other hand, low HST print media, having an effective amount of sizing to achieve fast drying time and low print mottle, can reach acceptable levels of print quality with a synergistic amount of salt loading Thus, as seen in the examples, the present disclosure can provide a fast drying print media, which exhibits low print mottle and high print quality, for inkjet printing. The print media of the present subject matter can be tailored to achieve low HST and high OD based on the amount of sizing and amount of salt loading used in preparing the print media.

Other embodiments of the present subject matter will be apparent from consideration of the present specification. It is intended that the present specification and examples be considered as illustrative only and as encompassing the equivalents thereof.

What is claimed is:

1. A print medium for inkjet printing comprising:

a base substrate comprising a blend of cellulosic fibers;

a sizing material present in an effective amount from about 0.25 Kg/Ton of the print medium to about 0.75 Kg/Ton of the print medium; and a multivalent cation salt present in a synergistic amount from about 8 Kg/Ton of the print medium to about 24 Kg/Ton of the print medium.

2. The print medium of claim 1, wherein the sizing material is alkyl succinic anhydride (ASA).

3. The print medium of claim 1, wherein the multivalent cation salt is calcium chloride.

4. The print medium of claim 1, wherein the synergistic amount of the multivalent cation salt ranges from about 8 Kg/Ton to about 20 Kg/Ton of the print medium.

5. The print medium of claim 1, wherein the print medium has a Hercules Size Test (HST) in a range of about 0-10 seconds.

6. The print medium of claim 1, wherein the print medium has a black optical density (KOD) of at least 1.15.

7. The print medium of claim 1, wherein the effective amount of the sizing material achieves HST of about 0.3-4.5 seconds.

8. The print medium of claim 1, wherein the sizing material is selected from a group consisting of starches, starch derivatives, carboxy methylcellulose (CMC), methyl cellulose, alginates, waxes, wax emulsions, alkylketene dimer (AKD), alkyl succinic anhydride (ASA), alkenyl ketene dimer emulsion (AnKD), emulsions of ASA with cationic starch, emulsions of AKD with cationic starch, ASA incorporating alum, polyvinyl alcohol, gelatin, acrylamide polymers, acrylic polymers, acrylic copolymers, vinyl acetate latex, polyesters, vinylidene chloride latex, styrene-butadiene, acrylonitrile butadiene copolymers, styrene acrylic copolymers, and combinations thereof.

9. The print medium of claim 1, wherein the multivalent cation salt is selected from a group consisting of calcium chloride ($CaCl_2$), magnesium chloride ($MgCl_2$), aluminum chloride ($AlCl_3$), magnesium sulfate ($MgSO_4$), calcium acetate ($Ca(C_2H_3O_2)_2$), calcium propionate $Ca(C_2H_5COO)_2$, calcium lactate $C_6H_{10}CaO_6.xH_2O$, calcium nitrate $Ca(NO_3)_2$, and combinations thereof.

10. A method of preparing a print medium for inkjet printing, the method comprising:

obtaining a base substrate comprising a blend of hardwood (HW) fibers and softwood (SW) fibers in a ratio ranging from about 100% (HW):0% (SW) to about 30% (HW):70% (SW);

selecting a sizing material in an effective amount ranging from about 0.25 Kg/Ton to 0.75 Kg/Ton of the print medium;

selecting a multivalent cation salt in a synergistic amount ranging from about 8 Kg/Ton to 24 Kg/Ton of the print medium; and adding the sizing material and the multivalent cation salt to the base substrate at a size press during a papermaking process to form the print medium.

11. The method of claim 10, wherein the sizing material is selected from a group consisting of starches, starch derivatives, carboxy methylcellulose (CMC), methyl cellulose, alginates, waxes, wax emulsions, alkylketene dimer (AKD), alkyl succinic anhydride (ASA), alkenyl ketene dimer emulsion (AnKD), emulsions of ASA or AKD With cationic starch, ASA incorporating alum, polyvinyl alcohol, gelatin, acrylamide polymers, acrylic polymers or copolymers, vinyl acetate latex, polyesters, vinylidene chloride latex, styrene-butadiene, acrylonitrile butadiene copolymers, styrene acrylic copolymers, and various combinations thereof.

12. The method of claim 10, wherein the multivalent cation salt is selected from a group consisting of calcium chloride ($CaCl_2$), magnesium chloride ($MgCl_2$), aluminum chloride ($AlCl_3$), magnesium sulfate ($MgSO_4$), calcium acetate ($Ca(C_2H_3O_2)_2$), calcium propionate $Ca(C_2H_5COO)_2$, calcium lactate $C_6H_{10}CaO_6.xH_2O$, calcium nitrate $Ca(NO_3)_2$ and combinations thereof.

* * * * *